United States Patent [19]

Collet

[11] 4,049,716

[45] Sept. 20, 1977

[54] COMPOSITIONS BASED ON POLYAMINES WITH ETHER GROUPS

[75] Inventor: Paul Collet, Saint-Fons, France

[73] Assignee: Rhone-Poulenc Industries, Paris, France

[21] Appl. No.: 673,993

[22] Filed: Apr. 5, 1976

[30] Foreign Application Priority Data

Apr. 18, 1975 France ............................... 75.12135
Dec. 24, 1975 France ............................... 75.39690

[51] Int. Cl.$^2$ ..................... C07C 91/02; C07C 91/06; C07C 91/40; C07C 93/02
[52] U.S. Cl. ............................. 260/573; 252/51.5 R; 252/51.5 A; 260/2.5 AC; 260/2.5 AQ; 260/77.5 AC; 260/77.5 AQ; 260/464; 260/583 K; 260/584 R
[58] Field of Search ........... 260/584 C, 584 R, 583 P, 260/584 B, 464, 2.5 AQ, 77.5 AQ, 2.5 AC, 77.5 AC, 573; 252/51.5 R, 51.5 A

[56] References Cited

U.S. PATENT DOCUMENTS

| 2,187,823 | 1/1940 | Ulrich et al. ..................... 260/573 X |
| 2,326,721 | 8/1943 | Bruson ................................. 260/464 |
| 2,828,265 | 3/1958 | Strien .......................... 252/51.5 R X |
| 3,042,631 | 7/1962 | Strandskov ........................... 260/2.5 |
| 3,377,383 | 4/1968 | Farkas et al. ..................... 260/584 R |
| 3,810,846 | 5/1974 | Atkinson ...................... 260/584 B X |

*Primary Examiner*—Daniel E. Wyman
*Assistant Examiner*—John J. Doll

[57] ABSTRACT

Polyamine ether compounds useful as intermediates for producing additives for lubricating oils are provided as well as a process for the production of said compounds.

6 Claims, No Drawings

COMPOSITIONS BASED ON POLYAMINES WITH ETHER GROUPS

GENERAL STATEMENT OF THE INVENTION

The present invention relates to new compositions based on polyamines with ether groups, and to the process for their preparation.

It is an object of the invention to provide novel polyamine ethers and a process for their preparation.

Other objects will be apparent to those skilled in the art from the present disclosure.

The compositions based on polyamines with ether groups, which form the subject of the invention, are characterized in thet they contain at least one of the polyamines with ether groups of the formula:

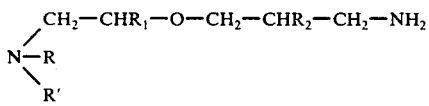 (I)

in which formula:

$R_1$ and $R_2$ are similar or different and represent a hydrogen atom or a methyl radical, R represents one of the following radicals:

—$CH_2$—$CHR_1$—O—$CH_2$—$CHR_2$—$CH_2$—$NH_2$

—$CH_2$—$CHR_1$—OH

—$CH_2$—$CHR_2$—$CH_2$—$NH_2$

R' represents one of the following radicals:

—$CH_2$—$CHR_1$—O—$CH_2$—$CHR_2$—$CH_2$—$NH_2$

—$CH_2$—$CHR_1$—OH

—$CH_2$—$CHR_2$—$CH_2$—$NH_2$ $C_1$-$C_4$-alkyl or phenyl

The said compositions can be prepared by cyanoethylation of at least one akanolamine of the formula:

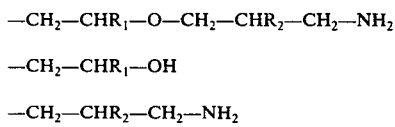 (II)

in which formula:

X represents a hydrogen atom or a —$CH_2$—$CHR_1$—OH radical and

X' represents a hydrogen atom, a —$CH_2$—$CHR_1$—OH radical, a $C_1$-$C_4$-alkyl radical or phenyl, with acrylonitrile or methacrylonitrile, followed by a hydrogenation of the nitrile or nitriles obtained, of the formula:

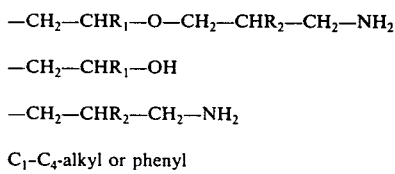

in which formula:

x represents one of the following radicals:

—$CH_2$—$CHR_1$—O—$CH_2$—$CHR_2$—CN

—$CH_2$—$CHR_1$—OH or

—$CH_2$—$CHR_2$—CN and x' represents one of the following radicals:

—$CH_2$—$CHR_1$—O—$CH_2$—$CHR_2$—CN

—$CH_2$—$CHR_1$—OH

—$CH_2$—$CHR_2$—CN

—$C_1$-$C_4$-alkyl or phenyl

Among the alkanolamines which can be used, there may be mentioned the monoalkanolamines, such as monoethenolamine and and monoisopropanolamine, the dialkanolamines such as diethenolamine and diisopropanolamine, the N-alkyldialkanolamines such as N-ethyldiethanolamine and N-ethyldiisopropanolamine, the N-phenyldialkanolamines such as N-phenyldiethanolamine and N-phenyldiisopropanolamine, the N-monoalkylmonoalkanolamines such as N-methylmonoethanolamine, the N-monophenylmonoalkanolamines such as N-phenylmonoethanolamine and N-phenylmonoisopropanolamine, and the trialkanolamines such as triethanolamine and triisopropanolamine.

The preferred alkanolamines are triethanolamine and N-ethyl-diethanolamine.

The amount of acrylonitrile or methacrylonitrile to be employed for preparing the polyamines with ether groups, which form the subject of the invention, depends on the number of groups containing mobile hydrogen in the alkanolamine of the formula II which is employed, and on the desired type of polyamine with ether groups, of the formula I.

If complete cyanoethylation of the alkanolamine employed is desired, a ratio of the number of groups with mobile hydrogen to the number of nitrile groups of the acrylonitrile or methacrylonitrile which is less then or equal to 1 is necessary; in general, from 1 to 1.2 mols of acrylonitrile or methacrylonitrile are used per group with mobile hydrogen in the alkanolamine.

If an incomplete cyanoethylation is desired for the purpose of preparing polyamines with ether groups, of the formula I, which carry at least one substituent $CH_2$—$CHR_1$—OH on the nitrogen, a ratio of the number of groups with mobile hydrogen to the number of nitrile groups of the acrylonitrile or of the methacrylonitrile which is greater then 1 is necessary; in general, if the alkanolamine of the formula II which is employed is a trialkanolamine, the molar ratio of trialkanolamine to nitrile can be between 0.34 and 2; if the alkanolamine employed has the formula NH—($CH_2$—$CHR_1$—OH)$_2$, the molar ratio of alkanolamine to nitrile can be between 0.34 and 2; is the alkanolamine employed is an alkyldialkanolamine or phenyldialkanolamine, the molar ratio of alkanolamine to nitrile can be between 0.55 and 2.

The cyanoethylation reaction of the alkanolamine of the formula (II) with the acrylonitrile or methacrylonitrile can be carried out in accordance with the general processes described in the literature (The Chemistry of Acrylonitrile, 2nd edition, Am. Cyanamid Corp., New York, 1958, p. 17- H. A. BRUSON, Organic Reactions, 1949, 5, 79; U.S. Pat. No. 2,326,721). It is usually carried out in the presence of a basic catalyst such as sodium, potassium, the oxides, hydroxides, alcoholates or amides of alkali metals, and the quaternary ammonium bases such as trimethylbenzylammonium hydroxide. The amount of alkaline reagent to be employed varies from 0.1 to 5%, relative to the weight of alkanolamine employed. In general, an amount less then 1% suffices to bring about the desired effect.

The cyanoethylation reaction is carried out at a temperature of between 0° and 100° C., preferably between 30° and 50° C.

The reaction can be carried out in the presence or absence of an organic solvent. By way of solvents, it is possible to use, for example, benzene, dioxane, pyridine and acetonitrile. The reaction can also be carried out in the presence of water.

When introducing the reactants, it is preferable to dissolve or disperse the catalyst in the alkanolamine, if appropriately diluted with the solvent, and to add the nitrile to the medium while stirring.

The cyanoethylation product obtained above can be hydrogenated directly or, if appropriate, after isolation by any suitable means. Its reduction can be carried out by the usual processes for the reduction of nitriles, HOUBEN-WEYL, Methoden der Organischen Chemie (Methods of Organic Chemistry), 4th edition, Volume XI/559 (1957). The most commonly used method is hydrogenation in the presence of nickel or cobalt catalysts which may or may not be deposited on a support. However, more particularly, Raney nickel or Raney cobalt are employed, in an amount of 5 to 30% relative to the weight of nitrile treated.

It is advantageous to carry out the hydrogenation with such catalysts in the liquid ammonia or preferably in the presence of a base in an aqueous or organic medium. As the basic agent it is possible to use barium hydroxide, sodium hydroxide, potassium hydroxide or lithium hydroxide, or quaternary ammonium hydroxides. The amount of base employed, expressed relative to the weight of nitrile treated, is about 1 to 30%.

The hydrogenation can take place in an organic solvent which is inert under the reaction conditions. It is possible to employ lower aliphatic alcohols such as methanol, ethanol, propanol and isopropanol, diols such as 1,2-ethanediol and 1,2-propanediol, ethers such as ethyl ether, butyl ether, dimethoxyethane, tetrahydrofurane and dioxane, and partial ethers of polyhydroxylic compounds such as ethylene glycol monomethyl ether or ethylene glycol monethyl ether.

The reaction can be carried out at a temperature of between 30° and 100° C., and preferably between 60° and 80° C., and under a hydrogen pressure of 10 to 200 bars; in general, a pressure of 20 to 30 bars is very suitable for carrying out the hydrogenation.

In practice, the cyanoethylation product is gradually added to the suspension of the catalyst which is kept under the chosen hydrogen pressure.

After the hydrogenation reaction, the catalyst is separated off, the basic agent is neutralized, the solvent is removed and the polyamines can be distilled under reduced pressure.

Among the polyamines with ether groups which correspond to the formula I, the following may be mentioned: tris-(3-oxa-6-amino-hexyl)-amine, N,N-bis-(3-oxa-6-amino-hexyl)-ethylamine, N,N-bis-(3-oxa-5-methyl-6-amino-hexyl)-ethylamine, N-(2-hydroxyethyl)-N,N-bis-(3-oxa-6-amino-hexyl)-amine, N,N-bis-(2-hydroxyethyl)-N-(3-oxa-6-amino-hexyl)-amine, N-(2-hydroxyethyl)-N-(3-oxa-6-amino-hexyl)-ethylamine, N-(2-hydroxyethyl)-N-(3-oxa-5-methyl-6-amino-hexyl)-ethylamine, tris-(3-oxa-5-methyl-6-amino-hexyl)-amine, N-(2-hydroxyethyl)-N,N-bis-(3-oxa-5-methyl-6-amino-hexyl)-amine and N,N-(2-hydroxyethyl)-N-(3-oxa-5-methyl-6-amino-hexyl)-amine.

The compositions which form the subject of the invention can be used as intermediates for the manufacture of additives for lubricating oils and as catalysts or crosslinking agents in the synthesis of polyurethanes. Thus, to form additives for lubricating oils the compounds of the present invention are condensed with an alkenylsuccinic anhydride, the alkenyl group containing from 20 to 200 carbon atoms, at a temperature of between about 120° and 230° C. This process is disclosed in the copending U.S. Application Ser. No. 673,975, filed on Apr. 5, 1976, of Gerared Soula and Philippe Duteurtre, entitled "New Compositions Based on Alkenylsuccinimides as Additives for Lubricating Oils." As catalysts or crosslinking agents in the synthesis of polyurethenes, the compounds of the invention are reacted in the usual fashion with a polyisocyanate and a polyol.

Specific Disclosure of the Invention

In order to disclose more clearly the nature of the present invention, the following examples illustrating the invention are given. It should be understood, however, that this is done solely by way of example and is intended neither to delineate the scope of the invention nor limit the ambit of the appended claims. In the examples which follow, and throughout the specification, the quantities of material are expressed in terms of parts by weight, unless otherwise specified.

EXAMPLE 1

Preparation of tris-(3-oxa-6-amino-hexyl)-amine by hydrogenation of tris-(3-oxa-5-cyano-pentyl)-amine.

a. Preparation of tris-(3-oxa-5-cyano-pentyl)-amine.

894 g. (6 mols) of triethanolamine and 9 cm.$^3$ (0.09 mol) of an aqueous sodium hydroxide solution of 36° Be strength are introduced into a 3-liter glass reactor equipped with a mechanical stirrer, an ascending condenser, a dropping funnel and a thermometer, the whole being kept under a nitrogen atmosphere.

954 g. (18 mols) of acrylonitrile are then run gradually over the course of 1 hour, 20 minutes into the vigorously stirred reaction mixture which is kept at a temperature of 35°–40° C.

When the addition of the acrylonitrile is complete, the reaction mixture is cooled to about 20°–25° C., the sodium hydroxide is then neutralized with 10 cm.$^3$ of hydrochloric acid (density 1.19) and the sodium chloride is removed by filtration.

1,851 g. of crude trinitrile are obtained in the form of a light yellow limpid liquid.

b. Preparation of tris-(3-oxa-6-amino-hexyl)-amine.

600 cm.$^3$ of a suspension of Raney nickel is absolute ethanol, containing 185 g. of Raney nickel, are introduced under a nitrogen atmosphere into a 3.6-liter stainless steel autoclave equipped with a stirrer system, an injection line and a thermocouple, and 3 cm.$^3$ of an aqueous sodium hydroxide solution at 36° Be strength are then added. After closing the autoclave, the latter is purged with nitrogen and then with hydrogen. Stirring is then started and hydrogen is introduced into the autoclave until a pressure of 25 bars is obtained.

The autoclave is heated to a temperature of 60° C. and 616 g. of crude trinitrile dissolved in 600 cm.³ of absolute ethanol are then injected in the course of 4 hours, 15 minutes; the injection line is rinsed with 100 cm.³ of absolute ethanol over the course of 20 minutes and the mixture is allowed to react for a further 30 minutes.

After this time, the autoclave is cooled to about 25° C. and then degassed, flushed with nitrogen, and opened.

The reaction mixture is recovered and the reactor is washed with 3 times 200 cm.³ ethanol. The catalyst is filtered off and 2,070 g. of a light yellow limpid filtrate are obtained. The sodium hydroxide introduced initially is neutralized with 3 cm.³ of hydrochloric acid (d = 1.19) and the filtrate is then concentrated by heating (85°-90° C.) under reduced pressure (15 mm. of mercury).

555 g. of crude amine are obtained, and are next subjected to a first distillation so as to remove the nonvolatile products. The distillation is carried out in a 1-liter boiler equipped with a Vigreux column.

421 g. of an oily liquid distilling at a temperature of below 215° C. under at most 6 mm. of mercury are collected.

In a second stage, the liquid obtained is rectified in a 1-liter boiler surmounted by a column packed with glass rings.

275.9 g. of tris-(3-oxa-6-amino-hexyl)-amine distilling at 192° to 201° C. under a pressure of 2 mm. of mercury and having a refractive index $n_D^{25}$ equal to 1.4822 are collected.

The purity of the product is determined by determining the nitrogen by the KJELDAHL method, and is found to amount to 97.6%.

EXAMPLE 2

Preparation of N,N-bis-(3-oxa-6-amino-hexyl)-ethylamine by hydrogenation of N,N-bis-(3-oxa-5-cyano-pentyl)-ethylamine.

a. Preparation of N,N-bis-(3-oxa-5-cyano-pentyl)-ethylamine.

1,330 g. (10 mols) of N-ethyldiethanolamine and 10 cm.³ (0.1 mol) of an aqueous sodium hydroxide solution at 36° Be strength are introduced, under a nitrogen atmosphere, into an apparatus such as thet described in Example 1.

1,060 g. (20 mols) of acrylonitrile are then run gradually over the course of 1 hour into the reaction mixture while stirring and maintaining a temperature of 35°-40° C.

When the acrylonitrile has been added, the reaction mixture is cooled to 20°-25° C., the sodium hydroxide is then neutralized with 10.5 cm.³ of hydrochloric acid (density 1.19) and the sodium chloride is filtered off.

2,386 g. of crude dinitrile which is in the form of a yellow-colored limpid liquid are obtained.

b. Preparation of N,N-bis-(3-oxa-6-amino-hexyl)-ethylamine.

600 cm.³ of a suspension of Raney nickel in absolute ethanol, containing 179 g. of Raney nickel, are introduced into an autoclave equipped as in Example 1, under a nitrogen atmosphere and 3 cm.³ of sodium hydroxide of 36° Be strength are then added. After closing the autoclave, the latter is flushed with nitrogen and then with hydrogen. The stirring is then started, the hydrogen is introduced under a constant pressure of 25 bars, and the mixture is heated to 60° C.

At this temperature, 597.5 g. of crude dinitrile dissolved in 600 cm.³ of absolute ethenol are injected over the course of 4 hours, 10 minutes.

The subsequent operations are carried out as described previously. 753.5 g. of crude amine are obtained; from this, after a first distillation, 516.2 g. of an oily liquid distilling at a temperature below 230° C. under at most 5 mm. of mercury can be obtained.

After rectifying the liquid obtained, 443.5 g. of N,N-bis-(3-oxa-6-amino-hexyl)-ethylamine distilling at 125°-130° C. under a pressure of 1-3 mm. of mercury, and having a refractive index $n_D^{25}$ of 1.4685 are collected.

The purity of the product, determined by nitrogen determination, amounts to 98%.

EXAMPLE 3

300 g. of triethanolamine (2 mols) and 3 ml. of commercial sodium hydroxide (36° Be strength) are introduced into a 2-liter flask equipped with a central stirrer, a dropping funnel, a condenser and a thermometer. The temperature is raised to 40° C. and 120 g. of acrylonitrile (2 mols) are run in over the course of 12 minutes while maintaining the temperature at 40° C. After all has been run in, 3.5 ml. of 10 HCl are introduced rapidly. The mixture obtained is then hydrogenated under the following conditions:

154 g. of Raney nickel suspended in 700 cm.³ of ethanol and 12 ml. of sodium hydroxide solution (36° Be strength) are introduced into a 3.6 liter autoclave stirred with a central anchor stirrer. After closing the autoclave, the latter is purged with nitrogen and then with hydrogen, and the hydrogen pressure is raised to 40 bars and the temperature to 60° C.

380 g. of the cyanoethylation mixture obtained above, dissolved in 400 cm.³ of alcohol, are then injected; the duration of injection is 62 minutes. 85 liters of hydrogen were thus absorbed, that is to say, 3.80 mols (S.T.P. conditions), representing 101% of theory.

The mixture is allowed to cool to ambient temperature, the crude reaction mixture is withdrawn from the autoclave, the catalyst is filtered off, the alcohol is driven off by distillation under atmospheric pressure and then under 15 mm. up to 130° C. in a boiler.

This gives 382 g. of a mixture which is analyzed by gas phase chromatography.

It is found that this mixture consists of 43% of triethanolamine, 0.5% of a product of the formula:

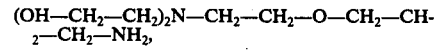

51% of a product of the formula:

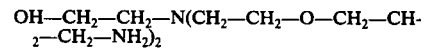

and 1.5% of tris-(3-oxa-6-amino-hexyl)-amine.

EXAMPLE 4

The cyanoethylation operation described in Example 3 is carried out, employing 300 g. of triethanolamine (2 mols) and 212 g. of acrylonitrile (4 mols).

The hydrogenation operation is carried out in accordance with the procedure of Example 3, on 493 g. of the cyanoethylation mixture obtained, in 500 cm.³ of alcohol; the volume of hydrogen absorbed is 190 liters, thet is to say, 7.8 mols (S.T.P. conditions), which represents 99% of theory.

After evaporation of the alcohol, 490 g. of a product are obtained, the composition of which, determined by gas phase chromatography is as follows:

traces of triethanolamine (product called A), traces of N,N-bis-(2-hydroxyethyl)-N-(6-amino-3-oxa-hexyl)-amine (product called B), 79% of N-(2-hydroxyethyl)-N,N-bis-(6-amino-3-oxahexyl)-amine (product called C) and 21% of tris-(3-oxa-6-aminohexyl)-amine (product called D).

After neutralization of the sodium hydroxide, 310 g. of this mixture are distilled under 0.5 to 1 mm. of mercury.

The following are collected:

98 g. of a fraction distilling at a temperature less then or equal to 189° C., and composed of 1% of B, 3% of A, 89% of C and 5% of D, 251 g. of a fraction distilling between 189 and 200° C. and composed of 1% of B and A, 78% of C and 21% of D, and 26 g. of a fraction distilling between 200 and 206° C. and composed of 1% of B and A, 44% of C and 55% of D.

EXAMPLE 5

The cyanoethylation operation described in Example 3 is carried out, employing 532 g. of ethyldiethanolamine (4 mols) and 282 g. of acrylonitrile (5.33 mols).

The hydrogenation operation is carried out in accordance with the procedure of Example 3, on 616 g. of the cyanoethylation mixture obtained, in 800 cm.³ of alcohol. The amount of hydrogen absorbed is 107 l., corresponding to 4.8 mols (S.T.P. conditions), which represents 90% of the theoretical amount.

After filtering off the catalyst and evaporating the alcohol, 620 g. of a mixture of the following composition are obtained: 3% of ethyldiethanolamine, 51% of a product of the formula:

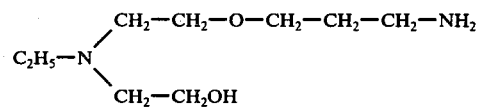

and 44% of a product of the formula:

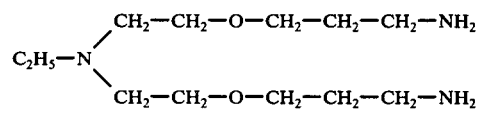

EXAMPLE 6

The cyanoethylation operation described in Example 3 is carried out, employing 532 g. of ethyldiethanolamine (4 mols) and 141 g. of acrylonitrile (2.66 mols).

The hydrogenation operation is carried out in accordance with the procedure of Example 3, on 616 g. of the cyanoethylation mixture obtained, in 700 cm.³ of alcohol. The amount of hydrogen absorbed is 115 liters, corresponding to 5.13 mols (S.T.P. conditions), representing 96% of the theoretical amount.

After filtering off the catalyst and evaporating the alcohol, 620 g. of a crude product are obtained, the composition of which is as follows: 33% of ethyldiethanolamine, 9% of the product of the formula:

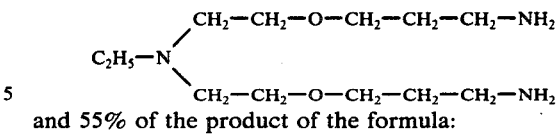

and 55% of the product of the formula:

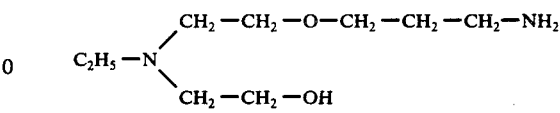

The terms and expressions which have been employed are used as terms of description and not of limitation, and there is no intention in the use of such terms and expressions of excluding ay equivalents of the features shown and described or portions thereof, but it is recognized that various modifications are possible within the scope of the invention claimed.

What is claimed is:

1. Compositions based on polyamines with ether groups, characterized in that they contain at least one of the polyamines with ether groups of the formula:

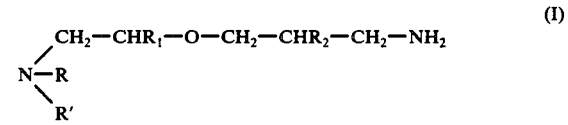

(I)

in which formula:
R$_1$ and R$_2$ are similar or different and represent a hydrogen atom or methyl radical,
R represents one of the following radicals:

—CH$_2$—CHR$_1$—O—CH$_2$—CHR$_2$—CH$_2$—NH$_2$

—CH$_2$—CHR$_1$—OH

—CH$_2$—CHR$_2$—CH$_2$—NH$_2$ and
R' represents one of the following radicals:

—CH$_2$—CHR$_1$—O—CH$_2$—CHR$_2$—CH$_2$—NH$_2$

—CH$_2$—CHR$_1$—OH

—CH$_2$—CHR$_2$—CH$_2$—NH$_2$

C$_1$-C$_4$-alkyl or phenyl.

2. A composition according to claim 1, consisting of tris-(6-amino-3-oxa-hexyl)-amine.

3. A composition according to claim 1, consisting of N-ethyl-N,N-bis-(3-oxa-6-amino-hexyl)-amine.

4. A composition according to claim 1, consisting of tris-(3-oxa-5-methyl-6-amino-hexyl)-amine.

5. A composition according to claim 1, characterized in that it contains at least one of the polyamines of the formula

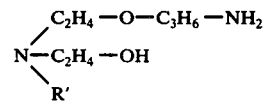

in which formula R' represents a —C$_2$H$_4$—O—C$_3$H$_6$—NH$_2$ or —C$_2$H$_4$—OH radical.

6. A composition according to claim 1, characterized in that it contains N-ethyl-N-(2-hydroxyethyl)-N-(6-amino-3-oxahexyl)-amine.

UNITED STATES PATENT AND TRADEMARK OFFICE
CERTIFICATE OF CORRECTION

PATENT NO. : 4,049,716
DATED : September 20, 1977
INVENTOR(S) : Paul Collet

It is certified that error appears in the above-identified patent and that said Letters Patent are hereby corrected as shown below:

Column 1, line 44, delete "akanolamine" and replace with -- alkanolamine --.

Column 2, line 20, delete "monoethenolamine" and replace with -- monoethanolamine --.

Column 2, line 21, delete "diethenolamine" and replace with -- diethanolamine --.

Column 2, line 43, delete "then" and replace with -- than --.

Column 3, line 50, delete "monethyl" and replace with -- monoethyl --.

Column 8, line 16, delete "ay" and replace with -- any --.

Signed and Sealed this

Twenty-seventh Day of December 197

[SEAL]

Attest:

RUTH C. MASON
Attesting Officer

LUTRELLE F. PARKER
Acting Commissioner of Patents and Trademark